United States Patent [19]

Servanty

[11] 3,769,878
[45] Nov. 6, 1973

[54] MACHINE TOOL FOR MACHINING COMPONENTS WITH TOROIDAL SLIDING SURFACES

[75] Inventor: Guy Emile Louis Servanty, Noisy-le-Roi, France

[73] Assignee: Societe D'Etudes Et De Recherches Appliquees S.E.R.A.P., Lechesnay, France

[22] Filed: Jan. 7, 1972

[21] Appl. No.: 216,173

[52] U.S. Cl. ............... 90/20, 51/73 R, 51/74 R, 51/96, 51/165.72, 408/127
[51] Int. Cl. ....... B23c 1/14, B24b 7/04, B24b 49/12
[58] Field of Search ................... 51/73, 74 R, 96, 51/215 R, 234, 245, 165.72, 290; 90/20; 408/127

[56] References Cited
UNITED STATES PATENTS

| | | | |
|---|---|---|---|
| 2,342,828 | 2/1944 | Armitage et al. | 51/165.72 X |
| 2,515,695 | 7/1950 | Caston | 51/73 R X |
| 2,635,395 | 4/1953 | Arms et al. | 51/215 R X |
| 2,883,808 | 4/1959 | Schreiber | 51/234 X |
| 3,030,739 | 4/1962 | Folley | 51/96 X |
| 3,181,401 | 5/1965 | Rice et al. | 51/165.72 X |
| 3,468,067 | 9/1969 | Larson | 51/96 |

*Primary Examiner*—Donald G. Kelly
*Assistant Examiner*—Howard N. Goldberg
*Attorney*—Neil F. Markva et al.

[57] ABSTRACT

A machine tool for machining components with toroidal surfaces comprising a fixed support which provides the virtual axis of revolution of the torus to be machined, a mobile table rotatively mounted about the axis and having drive means for rotating the table, and a working head provided with a tool the working plane of which is adjustable relative to the axis and is adapted to be aligned with the axis.

4 Claims, 2 Drawing Figures

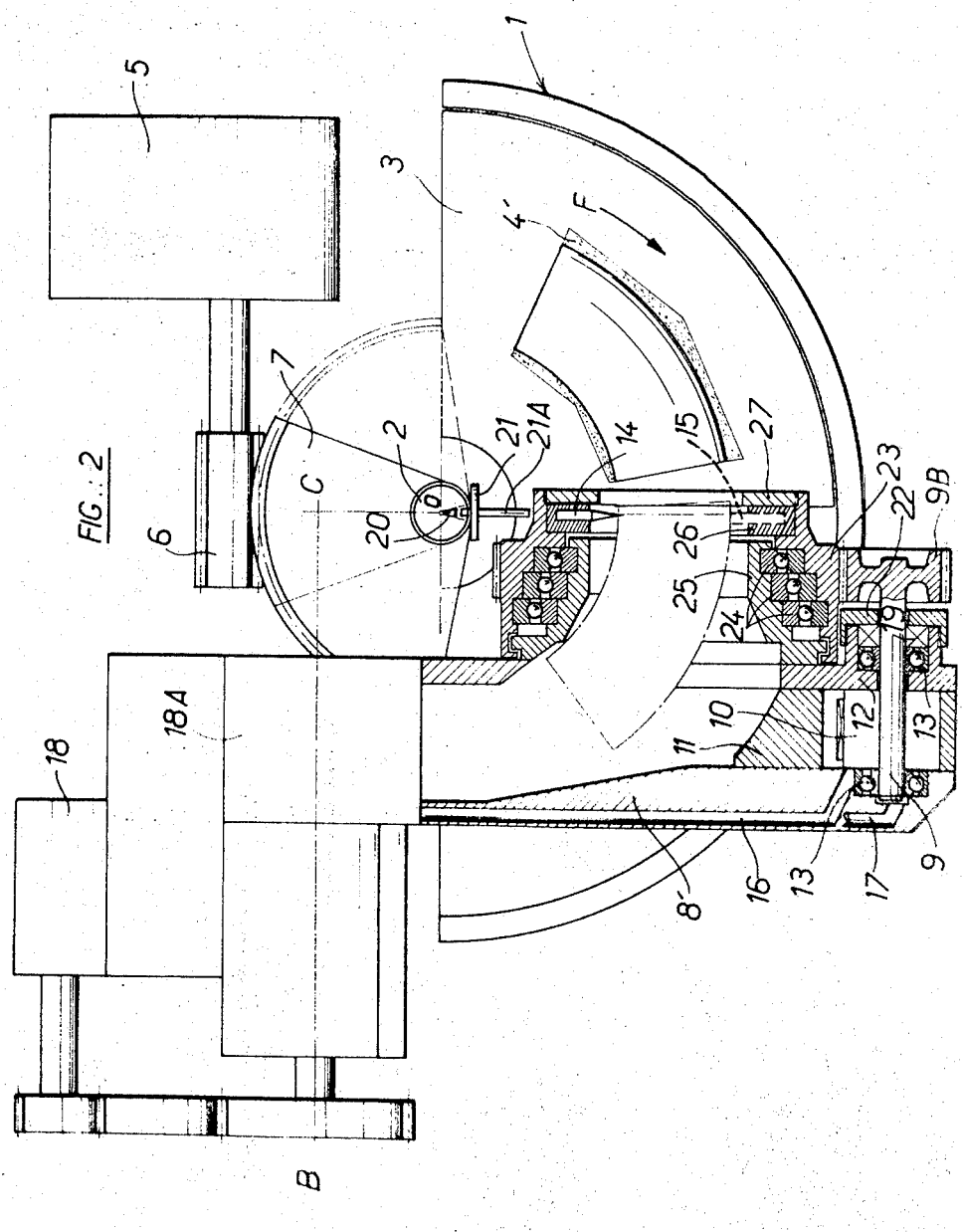

3,769,878

MACHINE TOOL FOR MACHINING COMPONENTS WITH TOROIDAL SLIDING SURFACES

BACKGROUND OF THE INVENTION

The present invention has the object of enabling the accurate machining of any material to produce a bore in the shape of a part of a torus with circular, elliptical or similar cross-section, as well as the machining of a corresponding male element, for example a piston adapted to slide with reduced clearance in this bore.

The invention has a particular field of application in the industrial production of jacks, servo-controls or pneumatic, hydraulic or hydropneumatic dampers and has the special feature of being capable of a movement along a path in the form of an arc of a circle.

Such jacks or servo-mechanisms with circular movements are necessary wherever parts or elements must be controlled, the movement of which takes place along a limited angular path about a hinge. These situations are often encountered in the control of elements of machines, and especially in aerodyne or naval controls and in the handling of various elements, such as aero brakes, the opening and closure control of doors, etc.

The normal solution consists in acting on a control lever by means of a jack or a servo mechanism with conventional straight movement, and has the drawback of requiring at least two additional articulations over and above the main actuation of the controlled element. It presents difficult problems with regard to the bulk and requires frequently the use of intermediate connecting rods for the transmission of forces.

Servo motors with circular movements have, therefore, in many applications substantial advantages compared with conventional apparatus with rectilinear movement, but their general application makes it necessary to provide a proper industrial realisation by giving them a very accurate geometrical form with a surface condition which is compatible with the required degree of tightness.

SUMMARY OF THE INVENTION

The object of the present invention is to provide machine tools which make possible a practical solution of the machining problems in a simple and convenient manner, with regard to the accurate surfacing of a bore with a toroidal wall or of a piston with a toroidal outer surface. In either case, the machine tool according to the present invention comprises in combination:

a fixed base substantiating with precision the virtual axis of revolution of the torus to be machined;

a mobile table driven in rotation about this axis;

a working head provided with a suitable tool whose operating plane is adjusted relatively to this axis to be aligned therewith.

In a preferred embodiment of such a machine tool, the axis of revolution of the torus is substantiated by collimating means of optical, laser, or other type, and the operating plane of the tool is adjusted with the aid of the collimating means. Preferably the working head is adjustable in its angular position about an axis which is perpendicular to the working plane of the tool.

BRIEF DESCRIPTION OF THE DRAWINGS

The invention will now be further described, by way of example, with reference to the accompanying drawings, in which:

FIG. 2 is a similar view showing a modification of the working head, constructed for machining a piston with a toroidal outer surface.

DESCRIPTION OF PREFERRED EMBODIMENTS

Figure 1:
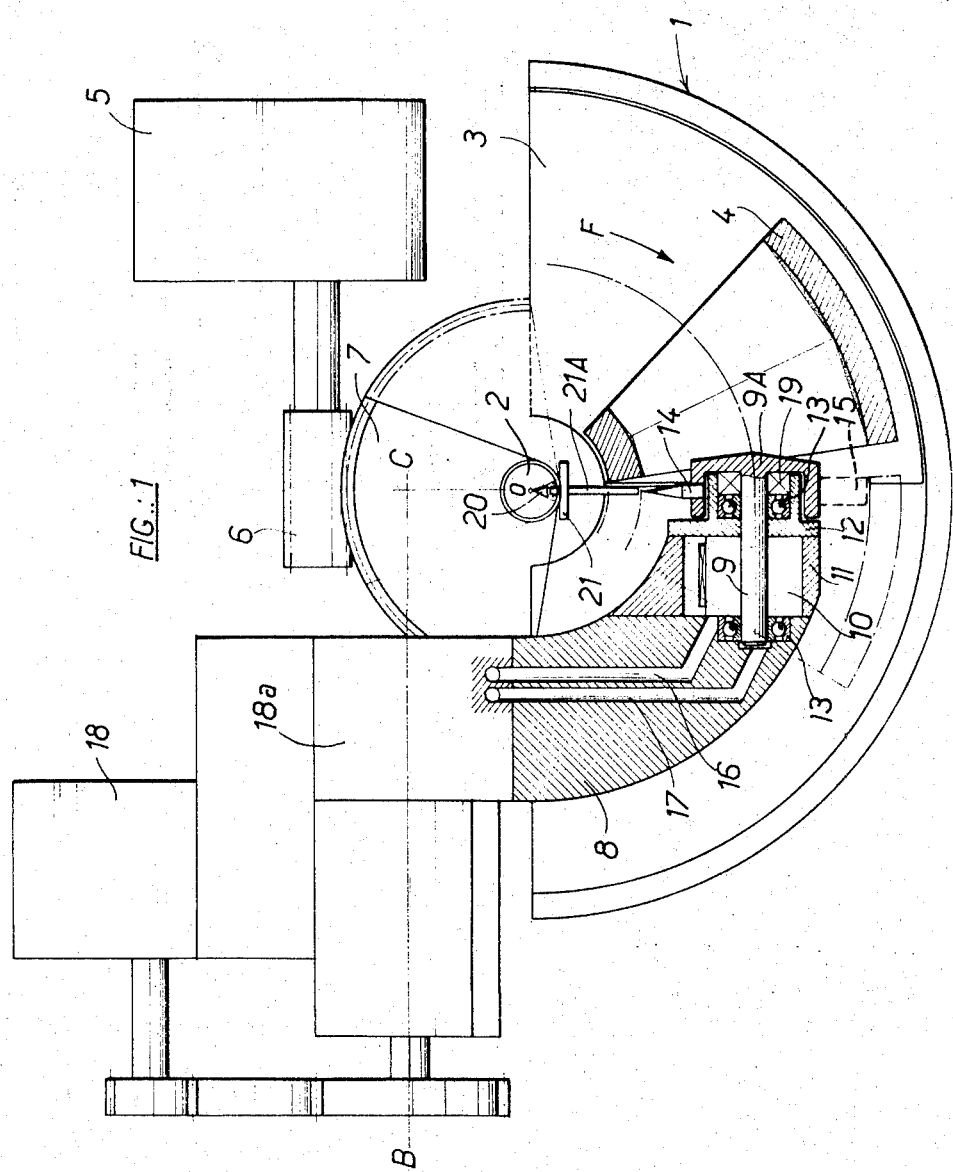
FIG. 1 is a diagrammatical, partly sectionalised plan view of one embodiment of a machine tool according to the invention, the working head of which is constructed for machining a bore with a toroidal wall.

Referring to the drawings, the machine tool comprises a main stationary support 1 which is constructed of a material having great strength, and a low coefficient of thermal expansion, and which may be mounted on the horizontal table of a conventional machine tool. The support 1, holding the assembly of mechanisms, is mounted on a hollow shaft 2.

Inside the hollow shaft 2 is a light source 20, masked in the direction of the working plane by a mask with a flexible joint 21, adjustable in position by a micrometer screw. A central sighting tube 21a passes through the mask 21, the tube having a small inner diameter and a length equal to at least twenty times the inner diameter. It is thus possible to substantiate with accuracy the axis of rotation 0 of the assembly by means of the narrow light beam issuing from the tube. Alternatively, the light source is replaced by a small, low energy laser generator, such as are commercially available. In this case, the generator is itself adjustable in position, so as to align the laser beam with the virtual axis of rotation of the system.

A mobile table 3 is rotatably mounted about the axis 0 and is adapted to receive a workpiece 4 or 4'. The table 3 is driven rotatively by a drive gear 5 having a speed adjustor and torque limiter, the mechanical transmission between the drive gear 5 and the turntable 3 being provided by an endless screw 6 and a gear 7.

A working head 8 or 8' is mounted above the table 3 and comprises a drive shaft 9 connected to the rotor of a turbine 10, a driving cylinder body 11, a bearing plate 12, two bearings 13, a sealing ring 19, and a milling cutter 14 and/or a finishing grinder 15.

The assembly of the parts 9 to 13 forms a hydraulic or pneumatic motor for driving the tool 14 or 15. Inlet and outlet conduits for the motive fluid of the turbine 10 are shown at 16 and 17 in the body of the working head 8 or 8'.

The working head 8 or 8' is connected to a fixing block which supports a drive gear 18 with variable speed and torque limiter, and a device 18A for the planetary movement of the head 8 or 8' about a horizontal axis B-C which is perpendicular to vertical working plane through axis 0 of the tool 14 or 15.

In the embodiment shown in FIG. 1, the working head 8, which is designed for the machining of a bore, has the form of a bulky toric serves to make the bore has the form of a crown sector, and the drive shaft 9 is integral with a tool holder 9A.

In the modification shown in FIG. 2, the working head 8' is designed for the machining of a solid toroidal piston and is likewise recessed. The drive shaft 9 passes freely through a nut 22 which compresses the joint 19 and is integral with a pinion 9B meshing with a driven pinion 23 mounted on three frictionless bearings 24 on a fixed ring 25. The tool holder 26 has a fixing bolt 27.

If a strictly toroidal surface with circular crosssection is to be machined, it is necessary for the working plane of the tool 14 to pass through the axis of rotation 0 forming the axis of revolution of the torus. To this end, the working head 8 or 8' is adjusted by means of a collimator type optical device, enabling the strict alignment of the plane of symmetry of the tool with the light or laser beam coming from the system 20, 21, 21A and substantiating the axis of rotation 0. The least departure from this position of strict alignment of the vertical plane of symmetry of the tool with respect to the rotation axis 0, will result in the machining of a toroidal surface whose cross-section will not be perfectly circular but rather elliptical, which incidentally may occasionally be the cross-sectional shape desired.

For carrying out a machining operation, the following process is adopted:

The work piece 4 or 4', having been previously roughed out cylindrically by conventional lathe work, for example in two successive sections as shown by the shaded zones in FIGS. 1 and 2, is fixed on the table 3 of the machine. The tool is rotated by supplying motive fluid to turbine 10 in he otherwise the working head 8 or 8', and the drive gear 5 is actuated to rotate the assembly of the turntable 3 and the workpiece 4 or 4' born on it. The workpiece 4 or 4' approaches and progresses past to the rotary milling-cutter 14 due to rotational movement of the table 3 around the axis 0 in the direction of the arrow F. The work-piece 4 or 4' is shown in solid lines as it approaches the rotary milling-cutter 14, i.e. prior to the machining, and in chain dotted lines as it progresses past to the rotor milling-cutter 14, i.e. after the machining.

For machine-finish truing, the grinder 15 is relied upon, and the above-described operation is identically repeated, except that the drive gear 18 is now actuated and, through the device 18A, it imparts the head 8 or 8' with a planetary movement about axis BC.

The workpieces 4 and 4' thus machine-finished, can be fitted inside each other to constitute respectively the toric cylinder and piston of a hydraulic or pneumatic curved jack or other similar apparatus, adapted to be mounted between two relatively angularly movable parts.

This apparatus with a piston moving along a curved path has substantial advantages compared with conventional jacks with rectilinear movement: gains in weight and bulk by eliminating hinged links, the risk of jamming as with articulated linkages, no need for hinge lubrication.

What is claimed is:

1. A milling-machine for machining continuous toroid surfaces geometrically generated by a complete closed plane curve rotated about an axis that does not intersect the curve, comprising in combination:
   a. a fixed support,
   b. collimating means on said support for substantiating said axis,
   c. a generally horizontal turntable rotatable on said support about said axis in a plane perpendicular thereto, and
   d. a working head extending above said turntable and having a surfacing tool rotatable in a plane substantially through said axis as substantiated by said collimating means.

2. A milling-machine as claimed in claim 1, wherein said surfacing tool is mounted for rotation in a plane which passes through said axis.

3. A milling-machine as claimed in claim 1, adapted for machining bores having a continuous toroid inner surface, wherein said working head comprises a bulky curved end section of general toric configuration freely engageable into and through said bores, said surfacing tool being fitted outwardly towards the tip of said end section.

4. A milling-machine as claimed in claim 1, adapted for machining outer toroid surfaces of workpieces, wherein said working head comprises a bulky end section formed with a curved recess of general toric configuration freely engageable by said workpieces along the extension of said outer surfaces, thereof, said surfacing tool being fitted inwardly towards the tip of said end section.

* * * * *